United States Patent Office 2,753,322
Patented July 3, 1956

2,753,322

RIGID VINYL HALIDE POLYMER COMPOSITIONS ADAPTED FOR VACUUM FORMING

Clarence E. Parks, Bay Village, and Garland B. Jennings, Avon, Ohio, assignors to The B. F. Goodrich Company, New York, N. Y., a corporation of New York No Drawing. Application November 2, 1954, Serial No. 466,454

11 Claims. (Cl. 260—45.5)

This invention relates to thermoplastic vinyl halide polymer compositions which possess excellent physical properties including ease of vacuum forming, and it relates particularly to hard, tough, rigid, but processable compositions adapted to vacuum forming, comprising an intimate mixture of a vinyl halide polymer, a polymeric resinous processing aid compatible therewith, a rubbery interpolymer and a resinous vinyl halide/vinyl ester interpolymer.

In the copending application of Clarence E. Parks and George L. Wheelock, Serial No. 353,446, filed May 6, 1953, there are disclosed a new class of rigid, hard, tough, vinyl halide polymer compositions which have extremely high impact resistance and other good physical properties. These compositions are intimate mixtures of a vinyl halide polymer, a polymeric resinous material compatible therewith such as a styrene acrylonitrile copolymer resin, and a rubbery interpolymer of a butadiene-1,3 hydrocarbon and acrylonitrile and at least one other copolymerizable monoolefinic monomer. When these polymeric ingredients are intimately mixed, the resulting rigid composition is unusually and surprisingly shock-resistant, and quite unexpectedly retains essentially all of the desirable properties of the original vinyl halide polymer virtually unimpaired and in good balance.

However, these compositions are not completely satisfactory in vacuum-forming operations. Vacuum forming consists of drawing a heat-softened thermoplastic sheet into a mold by pulling a vacuum. As is well known to those skilled in the art, vacuum forming possesses many advantages over other types of plastic forming. While the above-described polymer compositions are outstanding in most physical properties, they are not completely satisfactory in vacuum forming. Most objectionable is the tendency of these materials to thin down unevenly and tear at points of stress while being vacuum formed.

It is accordingly an object of this invention to provide a rigid, shock-resistant vinyl halide polymer composition readily adapted to vacuum forming which will stretch evenly and resist tear during the vacuum-forming operations and which at the same time retains the other desirable physical properties, including good calendering properties.

The objects of the invention are accomplished by providing compositions comprising intimate mixtures of a vinyl halide polymer, a polymeric resinous copolymer compatible therewith, a rubbery interpolymer of a butadiene-1,3 monomer, an acrylic nitrile and at least one other copolymerizable monoolefinic monomer, and an interpolymer of essentially a vinyl halide polymerized with a vinyl ester.

The rigid, hard, tough, vinyl halide polymer compositions of this invention have extremely high impact resistance, good processing characteristics, high tensile strength, excellent flexural strength, resistance to heat distortion, good heat and light stability, as well as the ability to be vacuum formed without the stock thinning down unevenly or tearing during the vacuum-forming operations.

In accordance with this invention, typical thermoplastic compositions especially useful in vacuum-forming operations are prepared, for example, by intimately blending, as by mastication and heat, about 100 weight parts of a vinyl halide polymer such as polyvinyl chloride, about 10 weight parts of a resinous copolymer of styrene and acrylonitrile or styrene and methyl methacrylate, about 10 weight parts of a rubbery interpolymer of a major proportion of 1,3-butadiene and minor proportions of acrylonitrile and styrene, and about 5 to 40 weight parts of a copolymer comprising about 70 to 95 weight parts vinyl chloride and about 5 to 30 weight parts vinyl acetate. The resulting compositions have tensile strengths in the range of about 6,000 pounds per square inch, flexural strengths of about 12,000 to 13,000 pounds per square inch, Izod impact values of about 16, sag temperatures of about 155 to 165° F., have excellent calendering properties and are processed in vacuum-forming operations without excessive thinning down or tearing of the stock at points of strain.

The interpolymers of vinyl halide and vinyl ester which are essential in preparing the compositions of this invention include all of the interpolymers made from a predominant amount of vinyl halide and a lesser amount of vinyl ester, that is, copolymers of a vinyl halide such as vinyl chloride preferably, vinyl fluoride and vinyl bromide, with a vinyl ester of either an aliphatic or aromatic acid, including vinyl acetate preferably, vinyl butyrate, vinyl benzoate, vinyl formate, vinyl chloroacetate, vinyl diethyl acetate, vinyl crotonate, vinyl propionate, vinyl isobutyrate, vinyl laurate, vinyl stearate, vinyl salicylate, vinyl alkoxy benzoates and the like. The proportions of vinyl halide and vinyl ester employed to prepare the copolymer may be varied from about 70 to 95 weight parts of vinyl halide and about 30 to about 5 weight parts of vinyl ester which results in an interpolymer of essentially the same composition. Preferred are copolymers made from monomer mixtures containing from about 80 to 95 weight parts vinyl halide and about 20 to 5 weight parts vinyl ester of an aliphatic acid. Particularly valuable copolymers for use in this invention include copolymers of vinyl chloride with vinyl acetate in proportions of from 90 to 80 weight parts vinyl chloride and 10 to 20 weight parts vinyl acetate. Small amounts of other monoolefinic monomers copolymerizable with the vinyl halide and the vinyl ester may be included in the monomer mixture, preferably in proportions of less than about 15 weight parts with more than about 70 weight parts vinyl chloride. For example, the following interpolymers have been found useful in the compositions of this invention: polymers from monomer mixtures consisting of 80 weight parts vinyl chloride, 10 weight parts vinyl acetate and 10 weight parts vinylidene chloride; 80 weight parts vinyl chloride, 10 weight parts vinyl acetate and 10 weight parts diethyl maleate; 85 weight parts vinyl chloride, 7.5 weight parts vinyl acetate and 7.5 weight parts diethyl maleate. Particularly preferred is an interpolymer containing about 80 weight parts vinyl chloride, about 18 weight parts vinyl acetate and about 2 weight parts isobutylene.

The amount of vinyl halide/vinyl ester interpolymer employed to obtain the vacuum-forming compositions of this invention may be varied from about 2 to about 40 weight parts interpolymer per 100 weight parts of a mixture of the other polymeric ingredients. Preferred ratios are from about 5 to 25 weight parts of the interpolymer of the vinyl halide and vinyl ester per 100 weight parts of a mixture of the other polymeric ingredients.

The vinyl halide polymers which are utilized in preparing the compositions of this invention include all of the normally hard, rigid, tough polymeric materials comprised predominantly of polymerized vinyl halide, that is, homopolymers of the vinyl halides such as polyvinyl chloride, polyvinyl fluoride and polyvinyl bromide. It is necessary that the polymer be essentially the homopolymer, although vinyl halide polymers containing small amounts, less than 5 percent of other monoolefins, may be employed to form useful, but not preferred vacuum-forming materials. This is to be contrasted to the before-mentioned Parks and Wheelock application wherein useful, rigid, impact-resistant compositions are obtained with co-polymers of vinyl chloride such as polymers containing 70 per cent vinyl chloride, 15 percent vinylidene chloride and 15 percent methyl methacrylate. To obtain the vacuum-formable compositions of this invention it is essential that both the polyvinyl halide polymer, preferably the homopolymer, and the hereinbefore-defined vinyl halide/vinyl ester interpolymer, be employed in the proportions set forth herein. The vinyl halide polymer preferably employed is polyvinyl chloride. However, vinyl chloride copolymers containing greater than 95 percent bound vinyl chloride and lesser amounts of other copolymerized monoolefinic monomers may be used. Such other copolymerizable monoolefinic monomers include vinylidene halides such as vinylidene chloride, acrylic and alpha-alkyl acrylic acids and alkyl esters, amides and nitriles thereof such as ethyl acrylate, methyl methacrylate, butyl methacrylate, acrylamide, acrylonitrile and the like; vinyl aromatic monomers such as the styrenes and vinyl naphthylene; vinyl alkyl ethers and vinyl alkyl ketones and the like.

The vinyl halide polymers may be prepared by any of the polymerization techniques known to and employed by those skilled in the art. Such methods as solution, suspension, emulsion and the like are preferred. The polyvinyl chloride preferred for this use is a hard, tough, high molecular weight material of uniform molecular weight distribution and particle size, so as to take advantage of all of the excellent properties inherent in this material. The form of the vinyl halide polymer may be the solid dried product in powder or granular form; or as a suspension, solution or emulsion, as will be more fully described hereinafter.

The polymeric, resinous, processing aids employed to prepare the compositions of this invention are preferably styreneacrylonitrile polymers which are compatible with the vinyl halide polymer. These resins are prepared by polymerizing a monomeric mixture consisting essentially of a styrene and an acrylic nitrile. Such mixtures may contain also minor amounts of other copolymerizable monoolefinic monomers of the type hereinbefore described as minor constituents. The styrene utilized is preferably styrene itself or nuclear- and alpha-substituted styrenes including alkyl styrenes such as alpha-methyl styrene, vinyl toluene, ethyl styrene; halo-styrenes such as the chlorostyrenes represented by monochlorostyrene and dichlorostyrenes; alkoxy styrenes and like styrene derivatives copolymerizable with acrylonitrile. The resin preferably contains greater than 50 percent bound styrene or is prepared from monomer mixtures containing greater than 50 weight percent of styrene. The acrylic nitrile comonomer employed in the monomer mixture is preferably acrylonitrile. Other useful acrylic nitriles include alpha-substituted acrylonitriles such as the alkyl acrylonitriles, methacrylonitrile and ethacrylonitrile, chloroacrylonitrile and the like, in amounts from 10 to 50 percent in the monomer mixture and resulting copolymer. The other minor monoolefinic constituents, if employed, are preferably less than 20 percent. It is preferred to use, however, polymers prepared from monomer mixtures containing about 65 to 85 weight percent of styrene and 15 to 35 weight percent of acrylonitrile. In any case the styrene-acrylonitrile polymer should be a hard, tough, high molecular weight thermoplastic material to obtain optimum results from its use with the other components of the composition.

The styrene-acrylonitrile polymers may be prepared by any of the polymerization techniques known to and employed by those skilled in the art. Such methods as solution, suspension, emulsion and the like are preferred. The form of the resin may be the solid, dried product in powder or granular form; as a suspension, solution or emulsion, as will be more fully described hereinafter. The amounts of styrene-acrylonitrile polymer employed in the compositions of this invention are from 1 to 40 weight parts per 100 weight parts of polyvinyl halide. Better results are obtained when using 1 to 20 parts, and the concentration is preferably from 1 to 10 parts per 100 weight parts of the vinyl halide polymer.

The styrene-alkyl methacrylate interpolymer may be used as a processing aid in the practice of this invention and they may be any polymer made from monomeric mixtures containing as the two essential monomers from 75 to 25 weight percent of styrene, a nuclear-substituted or alpha-substituted styrene derivative including such styrene derivatives as chlorostyrene, dichlorostyrene, the methyl styrenes, vinyl toluene, methyl styrene, methoxystyrene and the like; and from 25 to 75 weight percent of an ester of methacrylic acid such as aliphatic, alicyclic or aromatic methacrylates. Preferably employed are alkyl methacrylates wherein the alkyl group is methyl, ethyl, propyl, isopropyl, isobutyl, isoamyl or isohexyl; also useful are alicyclic methacrylates such as cyclohexyl methacrylate; phenyl methacrylate, benzyl methacrylate and the like; and methyl and ethyl ethacrylate and the like also may be employed in this invention. Other monomeric olefinic materials such as those described hereinbefore may be present in addition to the two essential monomers, but only in minor amounts of less than 20 weight percent of the total monomeric mixture. It is preferred to utilize a two-component monomeric mixture consisting of from about 60 to 40 weight percent of styrene and from about 40 to 60 weight percent of methyl methacrylate which results in an interpolymer of essentially the same composition. In any case the styrene-alkyl methacrylate polymer should be hard, tough, thermoplastic and high in molecular weight. The molecular weight is preferably about 40,000 or greater.

The interpolymer of styrene and an ester of methacrylic acid may be prepared by polymerization in solution, in mass or in an aqueous medium by suspension or emulsion polymerization techniques. Preferred is aqueous polymerization containing colloidal or surface-active agents in order to obtain a suspension of the polymer or an efficient emulsifying agent to obtain a polymer dispersion or latex.

The amount of styrene-methacrylic acid ester interpolymer utilized in the vinyl halide compositions, although critical, may be varied considerably depending on the properties and processing characteristics desired in the final product. Generally an amount from 1 to 40 and preferably from 5 to 20 weight parts per 100 weight parts of vinyl halide polymer is sufficient to realize the advantages of the present invention. Preferably from 5 to 15 weight parts are employed.

The rubbery interpolymers employed in the preparation of the polymer compositions of this invention contain a butadiene-1,3 hydrocarbon, an acrylonitrile and at least one other monoolefinic monomer copolymerizable with the butadiene-1,3-hydrocarbon and acrylonitrile. The interpolymers are prepared by polymerizing monomer mixtures containing preferably 1,3-butadiene, acrylonitrile and one or more of styrene, chlorostyrenes, alkyl acrylates, alkyl methacrylates and like monoolefinic comonomers. The monoolefinic comonomers which may be copolymerized with a butadiene-1,3 hydrocarbon and acrylonitrile are well known to those skilled in the are and include such materials as preferably styrene, dichlorostyrene and the like, and also include the alkyl acrylates such as ethyl acrylate, butyl acrylate, hexyl acrylate; alkyl methacrylates such as methyl methacrylate, butyl methacrylate, octyl methacrylate; vinyl alkyl ketones such as vinyl methyl ketone; vinyl alkyl ethers such as vinyl ethyl ether, vinyl pyridine, vinyl naphthalene and the like. In general the third monomeric constituent may be a vinylidene compound containing the group $CH_2=C<$, that is, containing a terminal methylene group attached by a double bond to a carbon atom. Other butadiene-1,3 hydrocarbons such as isoprene, and other acrylonitriles such as chloroacrylonitrile may also be employed. The ratio of the monomers by weight employed may be from about 50 to 90 percent butadiene-1,3 hydrocarbon, 5 to 30 weight percent of the acrylonitrile and 5 to 30 weight percent of the other copolymerizable monoolefinic monomers. It is preferred that only three component monomer mixtures be polymerized for the rubbery interpolymers to be used in this invention, but small amounts of other copolymerizable monoolefinic monomers as set forth above may be present in the monomer mixture. Better results are obtained when the interpolymer used is prepared from monomer mixtures containing from about 60 to 75 weight percent of 1,3-butadiene, from 10 to 20 weight percent acrylonitrile, and 10 to 20 weight percent of another monoolefinic monomer copolymerizable with the butadiene-1,3 hydrocarbon and an acrylonitrile, selected from the group consisting of styrenes, alkyl acrylates and alkyl methacrylates. A more preferred interpolymer is prepared from a monomer mixture containing 60 to 70 weight percent 1,3-butadiene, 15 to 20 weight percent acrylonitrile and 15 to 20 weight percent styrene. The polymer resulting from this monomer mixture contributes the best balance of physical properties to the compositions of this invention.

The rubbery interpolymers may be prepared by any of the polymerization techniques known to and employed by those skilled in the art, but emulsion polymerization is preferred. The interpolymer may be employed as the dry solid polymer, as a cement, dispersion, a latex and the like, and at any reasonable degree of conversion, although a conversion between 50 and 100 percent is preferred. The interpolymer is preferably polymerized to a Mooney value of about 25 to 150 ML, and interpolymer with a Mooney value of about 50 to 100 ML is more preferred. The interpolymer preferably has a low gel content to obtain optimum results.

The amount of rubbery interpolymer to be blended with the other ingredients to obtain the outstanding compositions of this invention may be varied within rather broad limits, and one is still able to obtain useful products; but if the advantages of the vinyl halide polymer are to be maintained, the amounts employed to obtain optimum results are rather critical. From 1 to 25 weight parts of interpolymer may be used per 100 parts of vinyl halide polymer and styrene-acrylonitrile or styrene-alkyl methacrylate polymer. Better results are obtained if 5 to 15 parts are employed, and preferably the amount is about 10 weight parts per 100 weight parts of the other two constituents.

In the practice of this invention the ingredients may be mixed in any order and the ingredients may be in any conventional form. One method is to blend the compatible resins, the vinyl halide polymer, the styrene-acrylonitrile polymer and the vinyl halide/vinyl ester interpolymer, by mixing the dry resin powders and then masticating with heating until a homogeneous sheet is formed. The resinous components may also be blended in a Banbury mixer or on a plastic mill by first working one resin until a homogeneous sheet is formed, and then adding the other resins with further working until complete homogeneity is obtained. The intermixture of these components may then be blended with the rubbery interpolymer in a Banbury mixer or on a plastic mill by working the rubbery interpolymer into the resinous blend. All of the polymeric ingredients may be blended together in such mixing equipment and also by first dissolving each polymer in a mutual solvent, mixing the solutions and then precipitating the polymer blend from the mixed solutions or by taking off the solvent as by evaporation. Preferably the separate polymer ingredients also may be prepared by polymerizing in the form of dispersions or emulsions or suspensions, and then blending the suspensions or dispersions and coagulating. For example, latex emulsions of the copolymer of styrene and acryonitrile and the rubbery interpolymer may be blended and added to a mixture of dispersions of polyvinyl chloride and the interpolymer of the vinyl chloride/vinyl ester and the mixture coagulated with an acid and/or a salt and then drying. These methods give particularly intimate mixtures of the ingredients. Still another method is to polymerize the monomeric ingredients of one polymer, add to this the monomers of one of the others, and successively continue the polymerization so as to "overpolymerize" the second and third polymers on the particles of the first. The method employed to obtain the mixture of the ingredients is not critical, the only requirement being that an intimate mixture of the ingredients be obtained.

Regardless of the method by which the initial blending of the polymers is accomplished, it is generally preferred that the blended polymers be worked or masticated under heat and pressure to insure efficient dispersion of the various ingredients in the mixture. The temperature at which the mastication is conducted is not critical and is dependent to some extent on the thermoplastic character of the resins and the rubbery interpolymer. Unplasticized polyvinyl chloride is efficiently blended with a styrene-acrylonitrile interpolymer by mastication at a temperature of about 300° F. and the vinyl chloride/vinyl ester interpolymer and the rubbery ingredient may be incorporated into this mixture at this or a slightly lower temperature. In general temperatures of from about 200° to 400° F. are found to be sufficient to accomplish efficient mastication and mixing of the blended compositions containing the full range of useful and permissible proportions of vinyl halide polymer, styrene-acrylonitrile polymer and the rubbery interpolymer.

For example, the resins may be prepared as fine dry powders and mixed on a plastic mill with closely-set heated rolls at about 300° F. The resins fuse after a few passes, and a sheet with a smooth-rolling bank is obtained. To this mixture is added the rubbery interpolymer the working continued. The resulting product may be extruded in sections which have very smooth surfaces. The product may also be readily calendered to form very thin smooth sheets on a three or four-roll calender at about 350° F. The product may also be press molded, laminated, embossed, cut, drilled, machined as well as vacuum molded and the like. The resulting products are rigid, shock-resistant, have good low temperature properties, good resistance to heat distortion and an excellent balance of stress-strain properties.

The vacuum-forming or molding operation consists of placing the polymer composition sheet of the desired thickness, generally from 0.01 to 0.08 inch thick cut to proper size over the mold. A clamping ring is then lowered into place and tightly clamped so that air cannot leak between the thermoplastic sheet and the top surface of the mold. The heater element is then pulled into position over the sheet. After a predetermined length of heating time has elapsed, ordinarily about 5 to 10 seconds per 0.01 inch of thickness, the valve to the vacuum pump or chamber is turned on, developing the vacuum which causes the softened sheet to be forced into the mold by atmospheric pressure pressing on the outer surface of the sheet. After a short cooling period the clamping ring is removed and the formed sheet taken out. The compositions of this invention are particularly adapted to this type of plastic forming and they are readily vacuum formed with a minimum of thinning or necking down with no tearing.

In the following examples will be found specific embodiments of the invention and details employed in the practice of the invention. The tests on all of the resulting samples are standard ASTM tests. All parts are by weight.

*Examples 1 through 4*

100 parts of high molecular weight polyvinyl chloride powder and 10 parts of a resin in powder form, which is obtained by polymerizing in emulsion a monomer mixture containing 75 parts of styrene with 25 parts of acrylonitrile, are intimately mixed and blended. 100 parts of this resin mixture are placed in a dough-type mixer and 2 parts of a tin mercaptide stabilizer added thereto. A rubbery interpolymer having a Mooney value of 70 ML and prepared by polymerizing a monomer mixture of 67 parts of 1,3-butadiene, 16 parts of acrylonitrile and 17 parts of styrene in a fatty acid soap emulsion at a temperature of 30° C. with potassium persulfate, is mixed with the resin in a ratio of 10 weight parts of interpolymer per 100 weight parts of polyvinyl chloride and 10 weight parts of the styrene-acrylonitrile resin. Portions of this polymer composition are then mixed in different batches with 5, 10, 15 and 20 parts of an interpolymer, per 100 parts of the other three polymer ingredients, said polymer made by polymerizing in aqueous dispersion a monomer mixture of 80.5 parts of vinyl chloride, 18.1 parts of vinyl acetate and 1.4 parts of isobutylene. The mixture of components is worked on a close-set two-roll plastic mill at about 300° F. The resulting product is sheeted off the mill and molded in standard test molds for 5 minutes under pressure at 345° F., the molds cooled and the molded stock removed. If necessary, the samples are machined to the required tolerances. The following test results are obtained on the samples:

| Example | 1 | 2 | 3 | 4 |
|---|---|---|---|---|
| Vinyl chloride-vinyl acetate/polymer isobutylene, parts. | 5 | 10 | 15 | 20. |
| Tensile strength, p. s. i. | 5,600 | 5,600 | 6,100 | 6,300. |
| Flexural strength, p. s. i. | 11,600 | 11,600 | 13,300 | 13,200. |
| Izod impact, pounds. | 16 | 16 | 16 | 16. |
| Sag temperature, °F. | 160 | 160 | 160 | 155. |
| Calendering properties. | Very good. | Very good. | Very good. | Very good. |

When calendered sheets of these four compositions are placed in a vacuum-forming apparatus, they are readily formed with a minimum of thinning down (and that area which thins is uniform) and no tearing.

The elongation to failure at given temperatures is an indication of the usefulness of these compositions in vacuum forming. The following are representative data for the four examples described above as compared to a mixture of polyvinyl chloride, the copolymer of styrene-acrylonitrile and the rubber interpolymer in the same proportions:

| Example | 1 | 2 | 3 | 4 | Control |
|---|---|---|---|---|---|
| Temperature, °F | 260 | 260 | 260 | 260 | 260 |
| Elongation, Percent | 600 | 550 | 600 | 560 | 380 |

It is apparent from the above data that the compositions of this invention have extremely excellent elongations at temperatures which would be employed in vacuum forming as compared to those of the control which has poor elongation at the higher temperatures. Further, the control is somewhat brittle so that it tears in addition to thinning down in the vacuum-forming operation.

*Examples 5 through 6*

Polyvinyl chloride, the resinous polymer of styrene with acrylonitrile, and the rubbery interpolymer of the types described in Example 1, are mixed in the same manner as described in Example 1 in proportions of 100 parts of the polyvinyl chloride, 10 parts of the styrene-acrylonitrile resin, and 10 parts of the rubbery interpolymer per 100 weight parts of the other two materials. This mixture is then mixed together with the following proportions of an interpolymer made by polymerizing a monomer mixture containing 87 percent vinyl chloride and 13 percent vinyl acetate. The mixture is well worked, samples molded into test slabs, and the following test results obtained:

| Example | 5 | 6 |
|---|---|---|
| Vinyl chloride-vinyl acetate polymer, parts. | 20 | 30. |
| Tensile strength, p. s. i. | 6,200 | 6,300. |
| Flexural strength, p. s. i. | 12,800 | 13,000. |
| Izod impact, pounds. | 15 | 10. |
| Sag temperature, °F. | 160 | 155. |
| Calendering properties. | Very good | Very good. |
| Vacuum forming. | ---do----- | Do. |

*Example 7*

Example 5 is repeated substituting for the styrene-acrylonitrile resin a copolymer of about 50 parts of styrene and 50 parts of methyl methacrylate. The composition has excellent physical properties and is readily vacuum formed into a useful article.

When these examples are repeated with another rubbery interpolymer which is prepared by the emulsion polymerization of a monomer mixture of 67 parts of 1,3-butadiene, 16 parts of acrylonitrile and 17 parts of 2,5-dichlorostyrene of a Mooney value of about 85 ML, similar excellent results are obtained, and the resulting polymer combination possesses an accompanying outstanding good balance of physical properties. Similarly, when an interpolymer containing methyl methacrylate instead of dichlorostyrene is employed, useful products are obtained.

When other rigid vinyl resins, other styrene-acrylonitrile polymers, other vinyl halide/vinyl ester interpolymers and other rubbery interpolymers of the types described are similarly employed, other useful products readily adapted to successful vacuum forming which also possess a good balance of other physical properties, are obtained.

Compounding ingredients such as extenders, stabilizers, colors and the like may be employed in preparing the compositions of this invention as is well known in the art so long as the balance between impact strength, flexural strength, tensile strength, processability, heat distortion and the like are not affected to such a degree that the composition is no longer useful as a tough, hard, rigid thermoplastic product.

While we have disclosed certain preferred embodiments of the invention in the examples, we do not thereby desire or intend to limit the invention solely thereto, for as has been disclosed, the materials, proportions and methods may be varied within wide limits, and equivalents may be employed without departing from the scope and spirit of the invention as defined in the appended claims, and it is to these only that we intend to limit the invention.

We claim:

1. An improved, shock-resistant, processable, rigid, vacuum-formable, thermoplastic composition comprising an intimate mixture of (1) rigid vinyl chloride homopolymer, (2) a hard, tough, resinous polymer of a predominantly monoolefinic mixture comprising 50 to 90 weight percent of styrene and 10 to 50 weight percent of acrylonitrile, (3) a rubbery interpolymer of a monomer mixture comprising 50 to 90 weight percent of a 1,3-butadiene hydrocarbon, 5 to 30 weight percent of acrylonitrile and 5 to 30 weight percent of at least one other monoolefinic monomer copolymerizable with 1,3-butadiene and acrylonitrile, and (4) a resinous interpolymer of a predominantly monoolefinic mixture comprising a major proportion of vinyl chloride and a minor proportion of a vinyl ester, said thermoplastic polymeric composition containing essentially from 1 to 40 weight parts of (2) based on 100 weight parts of (1), 1 to 25 weight parts of (3) based on 100 weight parts of (1) and (2), and from 2 to 40 weight parts of (4) based on 100 weight parts of (1), (2) and (3).

2. An improved, shock-resistant, processable, rigid, vacuum-formable, thermoplastic composition comprising an intimate mixture of (1) polyvinyl chloride, (2) an interpolymer of a monomer mixture comprising 65 to 85 weight percent styrene and 15 to 35 weight percent acrylonitrile, (3) a rubbery interpolymer of a monomer mixture comprising 50 to 90 weight percent 1,3-butadiene, 5 to 30 weight percent acrylonitrile and 5 to 30 weight percent of styrene, and (4) an interpolymer of a monoolefinic mixture comprising about 70 to 95 weight percent vinyl chloride and about 5 to 30 weight percent of a vinyl ester, said composition containing essentially 1 to 20 weight parts of (2) based on 100 weight parts of (1), from 5 to 15 weight parts of (3) based on 100 weight parts of (1) and (2), and from 2 to 40 weight parts of (4) based on 100 weight parts of (1), (2) and (3).

3. The vacuum-formable thermoplastic composition of claim 2 wherein the vinyl ester of (4) is vinyl acetate.

4. An improved, shock-resistant, processable, rigid, vacuum-formable, thermoplastic composition comprising an intimate mixture of (1) a hard, tough, high molecular weight polyvinyl chloride, (2) a hard, tough, resinous polymer containing about 65 to 85 weight percent styrene and about 15 to 35 weight percent acrylonitrile, (3) a rubbery interpolymer prepared from a monomer mixture containing 65 to 70 weight percent 1,3-butadiene, 15 to 20 weight percent acrylonitrile and 15 to 20 weight percent styrene, and (4) a copolymer of about 80 to 95 weight percent vinyl chloride and about 5 to 20 weight percent vinyl acetate, said composition containing from about 1 to 10 weight parts of (2) based on 100 weight parts of (1), from 5 to 15 weight parts of (3) based on 100 weight parts of (1) and (2), and from 2 to 40 weight parts of (4) based on 100 weight parts of (1), (2) and (3).

5. An improved, shock-resistant, processable, rigid, vacuum-formable, thermoplastic composition comprising an intimate mixture of (1) a hard, tough, high molecular weight polyvinyl chloride, (2) a styrene-acrylonitrile copolymer containing 65 to 85 weight percent of styrene with 15 to 35 weight percent acrylonitrile, (3) a rubbery interpolymer prepared from a monomer mixture containing 65 to 70 weight percent 1,3-butadiene, 15 to 20 weight percent acrylonitrile and 15 to 20 weight percent styrene, and (4) an interpolymer comprising about 80 to 95 weight percent vinyl chloride with about 5 to 20 weight percent vinyl acetate, said composition containing from 1 to 10 weight parts of (2) based on 100 weight parts of (1), 5 to 15 weight parts of (3) based on 100 weight parts of (1) and (2), and from 5 to 25 weight parts of (4) based on 100 weight parts of (1), (2) and (3).

6. An improved, shock-resistant, processable, rigid, vacuum-formable, thermoplastic composition comprising an intimate mixture of (1) a hard, tough, high molecular weight polyvinyl chloride, (2) a styrene-acrylonitrile copolymer containing about 75 weight percent of styrene with about 25 weight percent acrylonitrile, (3) a rubbery interpolymer prepared from a monomer mixture containing 65 to 70 weight percent 1,3-butadiene, 15 to 20 weight percent acrylonitrile and 15 to 20 weight percent styrene, and (4) an interpolymer comprising about 80 to 90 weight percent vinyl chloride with about 10 to 20 weight percent vinyl acetate, said composition containing from 1 to 10 weight parts of (2) based on 100 weight parts of (1), 5 to 15 weight parts of (3) based on 100 weight parts of (1) and (2), and from 5 to 25 weight parts of (4) based on 100 weight parts of (1), (2) and (3).

7. An improved, shock-resistant, processable, rigid, vacuum-formable, thermoplastic composition comprising an intimate mixture of (1) a hard, tough, high molecular weight polyvinyl chloride, (2) a styrene-acrylonitrile copolymer containing about 75 weight percent of styrene with about 25 weight percent acrylonitrile, (3) a rubbery interpolymer prepared from a monomer mixture containing 65 to 70 weight percent 1,3-butadiene, 15 to 20 weight percent acrylonitrile and 15 to 20 weight percent styrene, and (4) an interpolymer consisting essentially of about 80 weight percent vinyl chloride, about 18 weight percent vinyl acetate and about 2 weight percent isobutylene, said composition containing from 1 to 10 weight parts of (2) based on 100 weight parts of (1), 5 to 15 weight parts of (3) based on 100 weight parts of (1) and (2), and from 5 to 25 weight parts of (4) based on 100 weight parts of (1), (2) and (3).

8. An improved, shock-resistant, processable, rigid, vacuum-formable, thermoplastic composition comprising an intimate mixture of (1) a hard, tough, high molecular weight polyvinyl chloride, (2) a styrene-methyl methacrylate copolymer containing about 50 weight percent styrene and about 50 weight percent methyl methacrylate, (3) a rubbery interpolymer prepared from a monomer mixture containing 65 to 70 weight percent 1,3-butadiene, 15 to 20 weight percent acrylonitrile and 15 to 20 weight percent styrene, and (4) an interpolymer comprising about 80 to 95 weight percent vinyl chloride with about 5 to 20 weight percent vinyl acetate, said composition containing from 1 to 10 weight parts of (2) based on 100 weight parts of (1), 5 to 15 weight parts of (3) based on 100 weight parts of (1) and (2), and from 5 to 25 weight parts of (4) based on 100 weight parts of (1), (2) and (3).

9. An improved, shock-resistant, processable, rigid, vacuum-formable, thermoplastic composition comprising an intimate mixture of (1) a rigid vinyl halide polymer containing more than 95 percent polymerized vinyl halide and less than 5 percent of other monoolefinic monomers copolymerized with said vinyl halide, (2) a hard, tough, resinous polymer selected from the group consisting of (a) the polymerization product of a predominantly monoolefinic monomer mixture comprising 50 to 90 weight percent of a monomer selected from the class consisting of styrene, alpha- and nuclear-substituted alkyl and halo-styrenes and 10 to 50 weight percent of a monomer selected from the class consisting of acrylonitrile and alpha-substituted alkyl and chloro-acrylonitriles copolymerizable with the styrene monomers and (b) the polymerization product of a predominantly monoolefinic monomer mixture comprising 75 to 25 weight percent of a monomer selected from the class consisting of styrene, alpha- and nuclear-substituted alkyl and halo-styrenes and 25 to 75 weight percent of an ester of methacrylic acid, (3) a rubbery interpolymer of a monomer mixture comprising 50 to 90 weight percent of a 1,3-butadiene hydrocarbon, 5 to 30 weight percent of a monomer selected from the class consisting of acrylonitrile and alpha-substituted alkyl and chloro-acrylonitriles and 5 to 30 weight percent of at least one other monoolefinic monomer copolymerizable with said 1,3-butadiene and acrylonitrile, and (4) a resinous interpolymer of a predominantly monoolefinic monomer mixture comprising a major proportion of a vinyl halide and a minor proportion of a vinyl ester, said thermoplastic polymeric composition containing from 1 to 40 weight parts of (2) based on 100 weight parts of (1), 1 to 25 weight parts of (3)

based on 100 weight parts of (1) and (2), and from 2 to 40 weight parts of (4) based on 100 weight parts of (1), (2) and (3).

10. The method of improving the vacuum-forming properties of a rigid, shock-resistant, thermoplastic composition comprising a mixture of (1) 100 weight parts of a rigid vinyl halide polymer containing more than 95 percent polymerized vinyl halide and less than 5 percent of other monoolefinic monomers copolymerized with said vinyl halide, (2) 1 to 40 weight parts of a hard, tough, resinous polymer selected from the group consisting of (a) the polymerization product of a predominantly monoolefinic monomer mixture comprising 50 to 90 weight percent of a monomer selected from the class consisting of styrene and alpha- and nuclear-substituted alkyl and halo-styrenes and 10 to 50 weight percent of a monomer selected from the class consisting of acrylonitrile and alpha-substituted alkyl and chloro-acrylonitriles copolymerizable with the styrene monomers and (b) the polymerization product of a predominantly monoolefinic monomer mixture comprising 75 to 25 weight percent of a monomer selected from the class consisting of styrene and alpha- and nuclear-substituted alkyl and halo-styrenes, and 25 to 75 weight percent of an ester of methacrylic acid, and (3) 1 to 25 weight parts per 100 weight parts of (1) and (2) of a rubbery interpolymer of a monomer mixture comprising 50 to 90 weight percent of a 1,3-butadiene hydrocarbon, 5 to 30 weight percent of a monomer selected from the class consisting of acrylonitriles and alpha-substituted alkyl and chloro-acrylonitriles, and 5 to 30 weight percent of at least one other monoolefinic monomer copolymerizable with said 1,3-butadiene and acrylonitrile, which comprises adding to 100 weight parts of the other three polymeric components from 2 to 40 weight parts of an interpolymer of a predominantly monoolefinic monomer mixture comprising a major proportion of a vinyl halide and a minor proportion of a vinyl ester, and then masticating the polymer mixture while heating to effect an intimate mixture of the polymeric materials.

11. An improved, shock-resistant, processable, rigid, vacuum-formable thermoplastic composition comprising an intimate mixture of 100 weight parts of polyvinyl chloride, about 10 weight parts of a resinous copolymer of 65 to 85 weight percent styrene and 15 to 35 weight percent acrylonitrile, about 10 weight parts of a rubbery interpolymer of a monomer mixture comprising 60 to 70 weight percent 1,3-butadiene, 15 to 20 weight percent acrylonitrile and 15 to 20 weight percent styrene, and about 5 to 40 weight parts of a copolymer comprising about 70 to 95 weight percent of vinyl chloride and 5 to 30 weight percent of vinyl acetate.

References Cited in the file of this patent

UNITED STATES PATENTS

| | | |
|---|---|---|
| 2,330,353 | Henderson | Sept. 28, 1943 |
| 2,439,202 | Daly | Apr. 6, 1948 |
| 2,646,417 | Jennings | July 21, 1953 |